United States Patent
Anthes et al.

(10) Patent No.: US 7,260,900 B2
(45) Date of Patent: Aug. 28, 2007

(54) POWER SUPPLY INDEPENDENT DEVICE FOR PRODUCING A HOT AIR FLOW

(75) Inventors: Peter Anthes, Erbach (DE); Martin Liebeck, Darmstadt (DE)

(73) Assignee: Wella AG, Darmstadt (DE)

( * ) Notice: Subject to any disclaimer, the term of this patent is extended or adjusted under 35 U.S.C. 154(b) by 44 days.

(21) Appl. No.: 10/527,284

(22) PCT Filed: May 22, 2003

(86) PCT No.: PCT/EP03/05348

§ 371 (c)(1),
(2), (4) Date: Mar. 8, 2005

(87) PCT Pub. No.: WO2004/032668

PCT Pub. Date: Apr. 22, 2004

(65) Prior Publication Data

US 2005/0252023 A1     Nov. 17, 2005

(30) Foreign Application Priority Data

Sep. 11, 2002   (DE) ............................. 102 42 155

(51) Int. Cl.
*A45D 1/00*   (2006.01)

(52) U.S. Cl. ................. 34/97; 429/26; 132/271; 392/384; 126/401; 431/153

(58) Field of Classification Search .............. 34/97; 429/26; 392/384; 431/153; 126/401; 132/271
See application file for complete search history.

(56) References Cited

U.S. PATENT DOCUMENTS

| | | | |
|---|---|---|---|
| 3,150,657 A | 9/1964 | Schultz et al. | |
| 4,635,382 A * | 1/1987 | Bourdeau | 34/97 |
| 4,800,654 A * | 1/1989 | Levin et al. | 34/97 |
| 4,903,416 A | 2/1990 | Levin et al. | |
| 5,155,925 A * | 10/1992 | Choi | 34/97 |
| 5,857,262 A | 1/1999 | Bonnema et al. | |
| 6,959,707 B2 * | 11/2005 | Fujiwara | 126/401 |
| 2003/0150126 A1 * | 8/2003 | Chang et al. | 34/96 |
| 2004/0081871 A1 * | 4/2004 | Kearl et al. | 429/26 |
| 2006/0070255 A1 * | 4/2006 | Kokuo et al. | 34/96 |

FOREIGN PATENT DOCUMENTS

| | | |
|---|---|---|
| DE | 198 09 297 A1 | 9/1999 |
| GB | 2 170 705 A | 8/1986 |

* cited by examiner

*Primary Examiner*—S. Gravini

(74) *Attorney, Agent, or Firm*—Michael J. Striker

(57) ABSTRACT

The invention relates to a power supply independent device (1) producing a hot air flow (2). Heat (4) is produced by a catalytic heating element (5) which is energized by a liquid fuel, the hot air flow (2) being produced by an electric fan (7). The inventive device (1) is provided with a fuel cell (8) which supplies electric power to the fan (7). Said device comprises a tank (10) for the liquid fuel connected with the aid of a valve (11) to the fuel cell (8) and the heating element (5) in such a way that they are jointly supplied with the liquid fuel (6).

6 Claims, 1 Drawing Sheet

POWER SUPPLY INDEPENDENT DEVICE FOR PRODUCING A HOT AIR FLOW

CROSS-REFERENCE

The invention described and claimed hereinbelow is also described in PCT/EP 03/05348, filed on May 22, 2003 and DE 102 42 155.2, filed Sep. 11, 2002. This German Patent Application, whose subject matter is incorporated here by reference, provides the basis for a claim of priority of invention under 35 U.S.C. 119 (a)-(d).

BACKGROUND OF THE INVENTION

The invention relates to a power supply independent hot air dryer for generating a hot air flow.

One such hot air dryer is known from U.S. Pat. No. 5,857,262, for instance, which describes a hot air dryer for drying hair. The hot air is generated by a catalytic heating element, which is supplied with a liquid fuel; the flow of hot air is generated by an electric blower, which is supplied by a battery or a rechargeable accumulator. One disadvantage of this is that for operating the hot air dryer, not only must liquid fuel be replenished, but the battery must be replaced with a new battery from time to time or the accumulator must be recharged repeatedly externally, via a power supply unit, which in practice makes the device inconvenient to manipulate. For operating the hot air dryer, not only must the fuel reservoir be adequately filled, but the battery or the accumulator must be sufficiently charged.

SUMMARY OF THE INVENTION

The object of the invention is to create a hot air dryer of this same generic type which makes it unnecessary to replace or recharge a battery or accumulator for operating the device and thus makes the hot air dryer easier to manipulate.

BRIEF DESCRIPTION OF THE DRAWINGS

The invention will be described in further detail in terms of an exemplary embodiment.

DETAILED DESCRIPTION OF THE PREFERRED EMBODIMENTS

Figure 1:
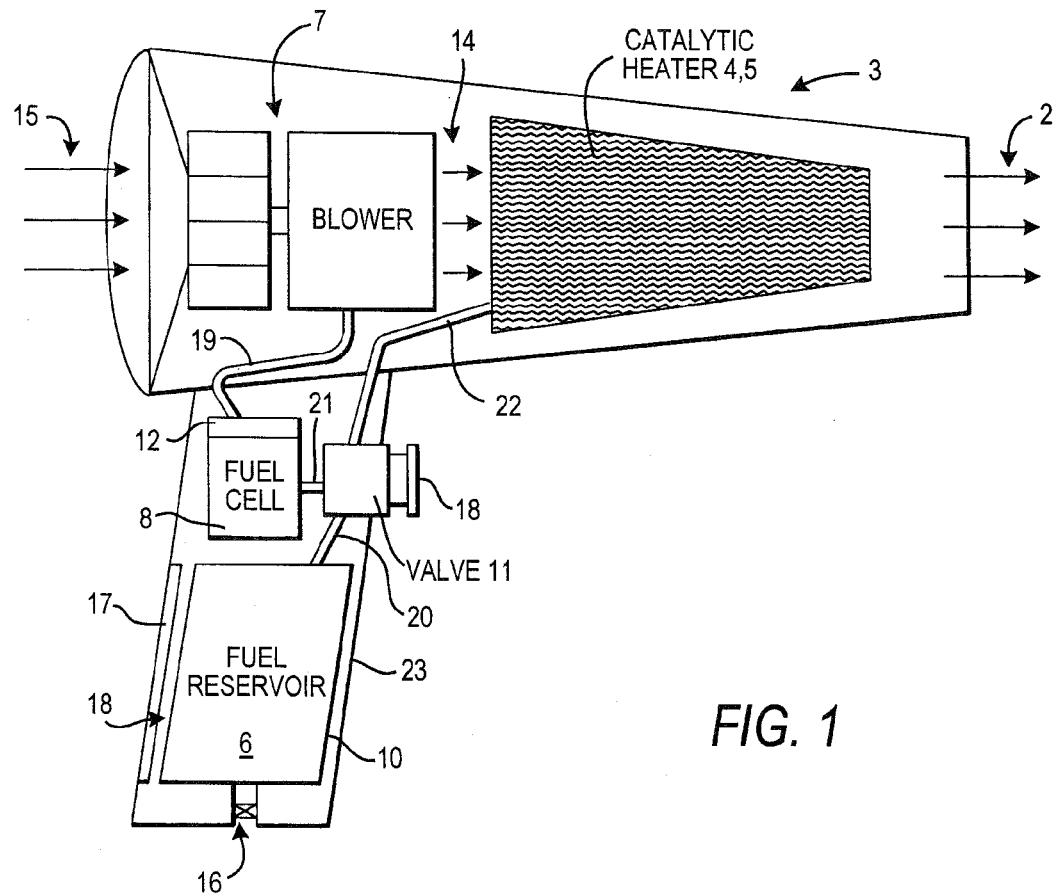
FIG. 1, in a schematic side view, shows a hot air dryer.

In FIG. 1, a power supply independent hot air dryer 3 for generating a hot air flow 2 for drying hair is shown; heat 4 is generated by a catalytic heating element 5, which is supplied by a gas of a liquid fuel 6. A stream 14 of the hot air 2 is generated by an electric blower 7, which aspirates ambient air 15. The hot air dryer 3 is provided with a fuel cell 8, which supplies the blower 7 with electrical energy 9 via a line 19. A fuel reservoir 10 for the liquid fuel 6 is provided, which communicates with the fuel cell 8 via a line 20, a valve 11, and a line 21, and with the catalytic heating element 5 via the valve 11 and a line 22, for the sake of supplying them jointly with the fuel 6 from the fuel reservoir 10. For ongoing operation of the device 1, only one operating fuel is needed. Pressing on an actuating device 18 opens the valve 11, and as a result the fuel cell 8 immediately furnishes electrical energy 9 to the blower 7 and supplies the catalytic heating element 5 with fuel 6. As a result, the valve 11 acts like an electrical on/off switch. Besides supplying the blower 7, the fuel cell 8 also supplies an electronic control unit 12, and selectively still other electric components 13 of the device 1 with electrical energy 9. A filling valve 16 is used for replenishing the fuel reservoir 10 with liquid fuel 6. For monitoring the level of liquid fuel 6, a viewing port 17 is provided, and at least in the region of the viewing port 17, the fuel reservoir 10 is of transparent material A handle 23 is used for grasping the hot air dryer 3 and also serves to hold the fuel reservoir 10, fuel cell 8, and valve 11.

The PEMFC fuel cell (Polymer Electrolyte Membrane Fuel Cell) is technologically mature at present; it is operated with a solid, thin, gas-tight, proton-conducting plastic membrane as its electrolyte. Hydrogen serves as the fuel 6. The output presently available is on the order of magnitude of power densities of approximately 1 W/cm$^2$. The weight per unit of power is approximately 2 kg/kW.

Since pure hydrogen, however, can be produced only by complicated reforming, there are worldwide efforts to find a way to use other anode gases. Promising candidates include the SOFC fuel cell 8 (Solid Oxide Fuel Cell). It enables a direct use of methane as an anode gas. The DMFC fuel cell 8 (Direct Methanol Fuel Cell) is a further starting point, which can be operated directly with methanol as the fuel 6, without reformation. These last two fuel cells 8, however, are at present still unsuitable for use in a portable hairstyling device.

The fuel reservoir 9 is filled with liquid hydrogen in the case of a PEMFC, with liquid methane in the case of an SOFC, and with liquid methanol in the case of a DMFC.

Although at present the PEMFC fuel cell is the sole possibility that can be employed immediately, this type of fuel cell is not limited to the invention. In the future, there will certainly be as yet unknown and improved forms of cells.

Figure 2:
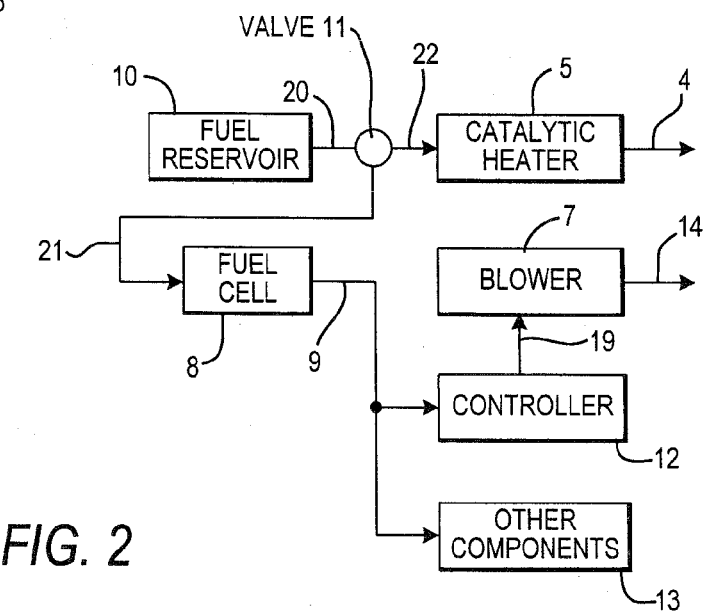
FIG. 2 shows a block circuit diagram to illustrate the function of the hot air dryer.

FIG. 2 shows a block circuit diagram for the function of the hot air dryer (hairdryer) of FIG. 1. By way of the valve 11 that can be switched by hand, the gaseous fuel 6 is supplied from the refillable fuel reservoir 10, which may for instance be embodied as a metal hydride reservoir, simultaneously to the catalytic heating element 5 and the fuel cell 8. As a result, heat 4 occurs in the heating element 5, and electrical energy 9 occurs in the fuel cell 8, for operating the electric blower 7, the electronic control unit 12 for the blower 7, and other electric components 13 of the hot air dryer. The air stream 14 of the blower 7 is carried through the heating element 5, thereby converting the heat 4 into a hot airflow 2 (FIG. 1)

LIST OF REFERENCE NUMERALS

2 Hot air flow
3 Hot air dryer
4 Heat
5 Catalytic heating element
6 Liquid fuel
7 Electric blower
8 Fuel cell
9 Electrical energy
10 Fuel reservoir
11 Valve
12 Electronic control unit
13 Electric component
14 Air stream
15 Ambient air
16 Filling valve 17 Viewing port
18 Actuating device
19 Line
20 Line
21 Line
22 Line
23 Handle

The invention claimed is:

1. A power-supply-independent hot air dryer (3) for generating a hot air flow, said hot air dryer (3) comprising
   a fuel reservoir (10) for a liquid fuel (6);
   a fuel cell (8) that produces electrical energy (9) from said fuel (6) when said fuel (6) is supplied to the fuel cell, said fuel reservoir (10) being located outside of or not within said fuel cell (8);
   an electrically powered blower (7) that generates an air stream when said electrical energy (9) is supplied to the blower (7);
   a catalytic heating element (5) for heating said air stream to produce the hot air flow (2) when the catalytic heating element (5) is supplied with said fuel (6); and
   means (11, 20, 21, 22) for jointly connecting said fuel reservoir (10) to said catalytic heating element (5) and to said fuel cell (8) to supply said fuel (6) to said fuel cell (8) in order to produce said electrical energy (9) and to simultaneously supply said fuel (6) to said catalytic heating element (5).

2. The hot air dryer (3) as defined in claim 1, further comprising an electronic control unit (12) connected electrically with said blower (7) and said fuel cell (8) SO that said electronic control unit (12) selectively controls supply of said electrical energy from said fuel cell to said blower (7) and other electrical components (13).

3. The hot air dryer (3) as defined in claim 1, wherein said means (11, 20, 21, 22) for jointly connecting said fuel reservoir (10) to said catalytic heating element (5) and to said fuel cell (8) comprises an operating valve (11), a fuel line (20) connecting the fuel reservoir (10) with the operating valve (11), another fuel line (21) connecting the operating valve (11) with the fuel cell (8), and a further fuel line (22) connecting the operating valve (11) with the heating element (5), so that when said operating valve (11) is operated the fuel (6) flows from the fuel reservoir simultaneously to the fuel cell (8) and the heating element (5).

4. The hot air dryer (3) as defined in claim 1, further comprising a viewing port (17) arranged in the vicinity of the fuel reservoir (10) and wherein at least a part of the fuel reservoir (10) is made of a transparent material in the vicinity of the viewing port (17).

5. The hot air dryer (3) as defined in claim 4, further comprising a filling valve (16) connected with the fuel reservoir (10), through which additional fuel can be supplied to the fuel reservoir (10).

6. The hot air dryer (3) as defined in claim 1, wherein said fuel cell is a polymer electrolyte membrane fuel cell, a direct methanol fuel cell, or a solid oxide fuel cell.

* * * * *